S. K. SUTTON.
Sled.
No. 70,287.
Patented Oct. 29, 1867.
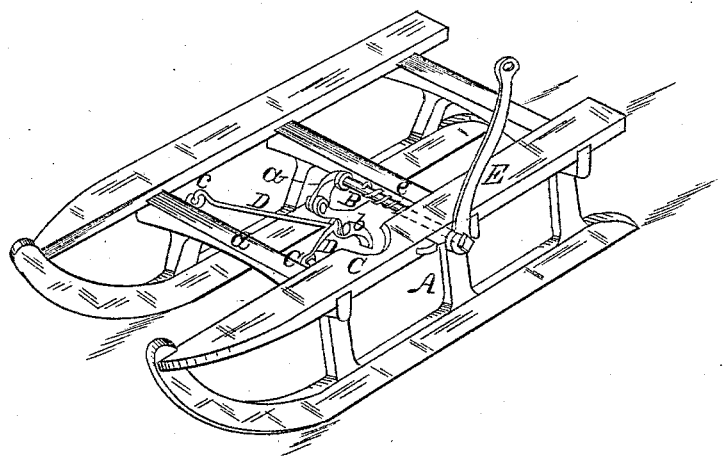

United States Patent Office.

SAMUEL K. SUTTON, OF PATERSON, NEW JERSEY.

Letters Patent No. 70,287, dated October 29, 1867.

IMPROVEMENT IN SLED-BRAKE.

The Schedule referred to in these Letters Patent and making part of the same.

TO ALL WHOM IT MAY CONCERN:

Be it known that I, SAMUEL K. SUTTON, of Paterson, in the county of Passaic, and State of New Jersey, have invented a new and improved Sled-Brake; and I do hereby declare that the following is a full, clear, and exact description thereof, which will enable others skilled in the art to make and use the same, reference being had to the accompanying drawing, and to the letters of reference marked thereon.

This invention relates to a new and improved brake for sleds, and it consists in operating a dog by means of a toggle connected to a shaft provided with a spring and a lever, all arranged as hereinafter set forth, so that by manipulating the lever the dog will be forced down into the ground, and the motion of the sled checked or entirely stopped, as desired.

The accompanying drawing represents a perspective view of a sled having my invention applied to it.

A represents a sled, which may be constructed in the usual or in any proper manner, and B a shaft, placed transversely thereon about at its centre, and extending half-way across. On the inner end of this shaft there is formed or firmly secured one arm, $a$, of a toggle, the other arm, $a'$, being connected by a pivot, $b$, to a dog, C, which is at the front end of two bars or rods, D D, the rear ends of the latter being connected by joints $c\ c$ to a cross-bar, $d$, of the sled. On the shaft B there is placed a spiral spring, $e$, which has a tendency to keep the toggle raised or thrown up, and the dog C above the surface of the ground and snow. On the outer end of the shaft B there is fitted a lever, E, which, on being shoved forward, causes the toggle to throw down the dog C into the snow, and into the ground if desired or necessary, in order to check or stop the movement of the sled.

Having thus described my invention, I claim as new, and desire to secure by Letters Patent—

The combination of the dog C with the toggle $a\ a'$, and the shaft B, provided with the spring $e$ and the lever E, all arranged and applied to the sled, to operate in the manner substantially as and for the purpose set forth.

The above specification of my invention signed by me this 19th day of August, 1867.

SAMUEL K. SUTTON.

Witnesses:
  W. TREWIN,
  J. ALISON FRASER.